United States Patent Office 2,886,544
Patented May 12, 1959

2,886,544
ALKYD RESINS FROM HEXAHYDROKOJIC ACID

Abraham Bavley, Brooklyn, and Charles J. Knuth, Flushing, N.Y., and Paul D. Thomas, Groton, Conn., assignors to Chas. Pfizer & Co., Inc., New York, N.Y., a corporation of Delaware No Drawing. Application August 5, 1955
Serial No. 526,785

4 Claims. (Cl. 260—22)

This invention is concerned with a new group of alkyd resins which possess superior properties and which are useful in the formulation of paints, varnishes, lacquers, enamels, metal primers and water emulsion paints, and in the preparation of textile finishes, leather coatings, binders, paints, pigments, plasticizers, gaskets, caulking compounds and slushing mixtures. In particular, the valuable alkyd materials of this invention are a group of polymeric substances made up of various polyesters of the cyclic trihydric alcohol hexahydrokojic acid.

Hexahydrokojic acid has the following formula

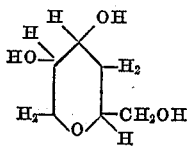

Its preparation by the hydrogenation of the fermentation product kojic acid is the subject of copending application Serial No. 526,768, filed August 5, 1955, Patent No. 2,850,508. Hexahydrokojic acid, unlike the material from which it is derived, that is kojic acid, is not an acidic substance but rather it is a neutral cyclic trihydric alcohol.

Methods for preparing alkyd resins are well known in the art. The preparation of such materials ordinarily involves heating a polyhydric alcohol and a polybasic organic carboxylic acid together until a suitable degree of polymerization is achieved. If a dibasic organic carboxylic acid such as phthalic acid or succinic acid and a dihydric alcohol such as ethylene glycol or propylene glycol is used, the product is generally a liquid material which is not heat convertible, that is, its viscosity does not increase as the product is heated. If a trihydric alcohol such as glycerol and a dibasic acid such as phthalic acid is used, the viscosity of the product depends upon the heat treatment used in its preparation. These materials are called heat convertible resins. The viscosity of such products increases as heating is continued and they can generally be converted into infusible, insoluble materials. This is the result of cross-linking of one polyester chain with another due to esterification of the free hydroxyl groups. A similar situation due to cross-linking prevails when a dihydric alcohol such as ethylene glycol or propylene glycol and a tribasic acid such as citric acid is used. When a stoichiometric ratio of such reactants, for example, a ratio of 2 moles of glycerol to 3 moles of phthalic acid is used, the resulting product is a gel, or a brittle, insoluble, infusible solid. A material with such properties is not useful for the purposes given above. Excessive cross-linking is avoided in the art by employing higher ratios of glycerol to dibasic acid and including in the reaction mixture various monobasic acids to reduce the number of free hydroxyl groups available to the dibasic acid. Thus the properties of the final product are controlled by the ratio of reactants employed and by the selection of the monobasic acid for the formulation. Other polyhydric alcohols that have achieved usefulness in the above manner include pentaerythritol, sorbitol, polymers of pentaerythritol, polymers of allyl alcohol, and certain other multifunctional alcohols such as polyvinyl alcohol. Measures of the sort described above are required in the use of these materials to control the degree of cross-linking which takes place. It has now been found that hexahydrokojic acid can be used in the preparation of alkyd resins and that the resulting resins have superior properties. For instance, they form coatings which are tougher from the standpoint of mechanical abrasion and chemical erosion than is true of previous alkyds employing, for example, glycerol as the polyhydric alcohol. It is thought that these valuable new alkyd resins owe their improved properties to the unique cyclic structure of the polyhydric alcohol, hexahydrokojic acid, employed in their preparation.

The valuable alkyd resins of this invention are prepared by strongly heating for several hours in an inert atmosphere a mixture comprising a monobasic acid, a polybasic acid, hexahydrokojic acid, and, in some cases, additional polyhydric alcohol components. In practice temperatures in the range 170–240° C. have been employed. The reaction takes place substantially in the range 170–210° C. and is completed by increasing the temperature to about 240° C. Higher temperatures are undesirable due to discoloration of the product. Lower temperatures may be employed if means for forcing the reaction to completion are provided such as distillation of volatile reaction products and the use of esterification catalysts such as mineral acids or strong organic acids such as the sulfonic acids, etc. When unsaturated monocarboxylic acids are used, higher temperatures are likely to lead to extensive cross-linking and gelation due to vinyl polymerization of this component. At the conclusion of the reaction period water remaining in the mixture as a by-product is removed by drying in vacuo. Alternatively, the final high temperature phase of the reaction can be carried out in vacuo. As pointed out above, the properties of the resulting resins depend upon the selection of mono and polybasic acids employed and upon the proportions of reactants charged. Further, variation in properties can be achieved by using blends of hexahydrokojic acid with other polyhydric alcohols of the types listed above.

In some cases, it is convenient to use the anhydride of the polybasic acid rather than the acid itself. Dibasic organic carboxylic acids or anhydrides thereof are preferred for the preparation of the valuable resins of this invention. Formulation of the reaction mixture to produce a resin with a specific set of properties is simpler with a dibasic acid than with an acid containing three or more carboxyl groups due to the fact that such higher polybasic acids afford further opportunity for cross-linking which must be controlled. However, in some cases higher polybasic acids may be advantageously employed. Dibasic and higher polybasic acids and anhydrides thereof that have been found useful include sebacic acid, maleic acid, oxalic acid, phthalic acid, terephthalic acid, succinic acid, aconitic acid, citric acid, butanetricarboxylic acid, itaconic acid, reaction products of maleic anhydride with rosin, or with various terpene hydrocarbons such as α-terpinene, and limonene, tung oil, etc.

A particularly valuable series of compounds has been prepared using hexahydrokojic acid as the polyhydric alcohol and phthalic anhydride, as the source of polybasic acid. By varying the choice of monobasic organic carboxylic acid selected, and the proportions of the reactants, resins with a wide range of properties have been obtained. It is generally desirable to adjust the total available carboxyl content of the medium so that it is about equal to the hydroxyl content thus yielding a resin with a low acid number. Resins with low acid numbers can also be obtained using an excess of the alcoholic component. It has been found that the resins having acid numbers of not more than about 80 have the optimum properties for the uses given above. For a given proportion of hexahydrokojic acid employed the properties of the resin produced are a function of the structure of the monocarboxylic acid selected and the ratio of the amount of dibasic acid to monocarboxylic acid charged. For example, if the monocarboxylic acid is a lower aliphatic acid such as acetic or propionic acid, the resulting resin is only slightly less brittle than that obtained from hexahydrokojic acid and phthalic anhydride as above. Use of a relatively high molecular weight aliphatic acid that is a fatty acid such as lauric, myristic, palmitic, or stearic yields a more pliable resin due to the plasticizing effect of the fatty acid chain. Aromatic monocarboxylic acids such as benzoic, toluic, and naphthoic acids yield resins with intermediate properties. When the above monobasic acids are used, the resins are restricted in regard to their heat convertibility since no functionality remains for cross-linking. A useful variation is to employ an unsaturated fatty acid such as is obtained by the hydrolysis of a drying oil. When such a resin is used in a varnish or lacquer, a film is obtained which dries on exposure to air by oxidative interaction of the carbon-carbon unsaturations of the monocarboxylic acid as occurs when a drying oil hardens. This results in cross-linking. It has been found that the most favorable proportion of reactants involves molar ratios of dibasic carboxylic acid to monobasic carboxylic acid in the range 0.5–3.0 with the polyhydric alcohol amounting to about 30–40 mole percent of the mixture. Use of a ratio of phthalic anhydride to monobasic acid high in this range yields a resin which is relatively hard and brittle due to extensive cross-linking. By decreasing the proportion of polybasic acid to monobasic acid, a resin more resilient and resistant to mechanical abrasion is obtained.

In one specific embodiment of this invention, equimolar quantities of phthalic anhydride, linoleic acid, and hexahydrokojic acid were mixed and heated for eight hours under an atmosphere of nitrogen. The maximum temperature reached during this time was 237°. At the end of the heating period, the resin was dried in vacuo and then evaluated. It was found to have an acid number of 24 and viscosity of greater than 150 poises. A lacquer consisting of a 50% solution of the resin in 1:1 toluene-butyl acetate and containing cobalt and lead naphthenates as driers was prepared. This lacquer was then used to coat pieces of glass. Some were air-dried and found to yield a tack-free film in 24 hrs. Others were baked at 145° C. overnight. The baked coatings adhered firmly to the glass, could not be scratched with the fingernail, and were unaffected by immersion in 10% aqueous sodium hydroxide for 20 minutes. For comparison, the corresponding glycerol alkyd resin was prepared using the above formulation, but substituting glycerol for hexahydrokojic acid. The dry resin itself had an acid number of 28 and a viscosity of about 150 poises. When used as above to coat pieces of glass, a considerably less durable film resulted. It could be easily scratched with the fingernail and was largely destroyed by 20 minutes exposure to 10% aqueous sodium hydroxide.

A useful variation when it is desired to use a fatty acid as the monocarboxylic acid is to use a fat or an oil as the source of the fatty acid since the fat or oil is generally much cheaper than the corresponding fatty acid. This a particularly useful adjunct with drying oils and it can actually be used to upgrade low quality drying oils. The oil and the hexahydrokojic acid along with any additional polyhydric alcohol component it is desired to use are charged to the reaction vessel. A small amount of a transesterification catalyst is added and the mixture is heated at about 170–240° for about two hours. Transesterification catalysts are generally basic substances and include sodium hydroxide, sodium alkoxides, metallic sodium, zinc oxide, alumina, magnesium oxide, lime and various soaps including calcium, sodium, lead, zinc, magnesium, and aluminum soaps. Transesterification is considered to be complete when a cooled sample of the mixture is readily soluble in alcohol. At this point the polybasic acid is added and the process continued in the usual fashion.

The following examples are given to further illustrate the invention, but they are not to be considered as placing any limitation thereon. In fact, resort may be had to many widely varying embodiments without departing from the spirit and scope thereof.

*Example I*

Phthalic anhydride, 17.8 grams (0.12 mole), 59.0 grams (0.21 mole) of linoleic acid, and 22.7 g. (0.15 mole) of hexahydrokojic acid were mixed and heated. The temperature was increased from about 170° to a maximum of 237° C. in eight hours. A condenser adjusted for distillation was connected to the flask and 3 ml. of volatile material was collected during this time. The mixture was then allowed to cool while it was dried in vacuo at about 20 mm. of mercury. The so-obtained alkyd resin was a clear brown viscous liquid. It had an acid number of 22 and a viscosity of about 80 poises.

*Example II*

The process of Example I was repeated with the substitution of 0.15 mole of glycerol for the hexahydrokojic acid. The product was also a clear brown resin which, however, was considerably less viscous than the material of Example I. It has an acid number of 17 and a viscosity of about 15 poises.

*Example III*

Two-tenths of a mole each of phthalic anhydride, linoleic acid, and hexahydrokojic acid were mixed and heated to 240° C. in about 8 hours. The product was dried as in Example I to yield an extremely viscous clear brown resin having an acid number of 22 and a viscosity of over 150 poises.

*Example IV*

In order to further evaluate the above resins and compare them, lacquers were prepared consisting of 50% solutions of each of these resins in 1:1 toluene-butyl acetate. Cobalt naphthenate and lead naphthenate were added to an extent of .05% cobalt based on the weight of the resin and 0.2% lead based on the weight of the resin. These lacquers were then painted onto squares of glass and baked overnight at 145°. The resins based on hexahydrokojic acid yielded hard transparent films which strongly adhered to the glass and could not be scratched with the fingernail. Those based on glycerol were considerably softer and could be scratched with the fingernail. Immersion of coated glass squares prepared from each of the above resins in 10% aqueous sodium hydroxide solution for 20 minutes at room temperature did not effect the coating based on the hexahydrokojic acid resins of Example III. Those based on glycerol were largely destroyed and a caustic solution has a yellow color. The caustic solution used with the hexahydrokojic acid resin of Example III remained colorless. A film based on the hexahydrokojic acid alkyd resin of Example III was also dried at room temperature. It yielded a tack-free coating in 24 hours in the air.

What is claimed is:

1. An alkyd resin comprising the reaction product of hexahydrokojic acid and a member of the group consisting of dicarboxylic acids and the anhydrides thereof, the temperature of reaction being substantially between 170–240° C. and hexahydrokojic acid being present in the reaction mixture in an amount by weight substantially between 30 and 40 mol percent based on the weight of the reaction mixture.

2. An alkyd resin comprising the reaction product of hexahydrokojic acid, a mono-caboxylic acid, and a member of the group consisting of dicarboxylic acids and the anhydrides thereof, the temperature of reaction being substantially between 170-240° C., the hexahydrokojic acid being present in the reaction mixture in an amount by weight substantially between 30 and 40 mol percent based on the weight of the reaction mixture and the molar ratio of said member of said group to the monocarboxylic acid being substantially between 0.5 and 3.0.

3. An alkyd resin comprising the reaction product, at a temperature substantially between 170 and 240° C., between a dicarboxylic acid and the reaction product of hexahydrokojic acid and a glyceride ester of a monocarboxylic acid in the presence of a transesterification catalyst at a temperature substantially between 170 and 240° C., the amount of hexahydrokojic acid employed being from about 30–40 mol percent of the weight of the reactants expressed as the sum of the weight of the hexahydrokojic acid reactant, the dicarboxylic acid reactant and the weight of said glyceride ester expressed as an equivalent amount of the monocarboxylic acid of said glyceride ester and the molar ratio of said dicarboxylic acid to the said glyceride ester expressed as the molar ratio of said dicarboxylic acid to an equivalent amount of the monocarboxylic acid of said glyceride ester being substantially between 0.5 and 3.0.

4. A process for producing an alkyd resin comprising the steps of reacting hexahydrokojic acid and a glyceride ester of a monocarboxylic acid at a temperature substantially between 170 and 240° C. in the presence of a transesterification catalyst and subsequently reacting resultant product with a dicarboxylic acid at a temperature substantially between 170 and 240° C., the amount of hexahydrokojic acid employed being from about 30–40 mol percent of the weight of the reactants expressed as the sum of the weight of the hexahydrokojic acid reactant, the dicarboxylic acid reactant and the weight of said glyceride ester expressed as an equivalent amount of the monocarboxylic acid of said glyceride ester and the molar ratio of said dicarboxylic acid to the said glyceride ester expressed as the molar ratio of said dicarboxylic acid to an equivalent amount of the monocarboxylic acid of said glyceride ester being substantially between 0.5 and 3.0.

References Cited in the file of this patent

UNITED STATES PATENTS 2,572,085     Wittcoff et al.     Oct. 23, 1951

OTHER REFERENCES

Maurer: Deutsche Chemische Gesellschaft Berichte, volume 64, pages 2358–2360 (1931).